US008150851B2

(12) United States Patent
Jones

(10) Patent No.: US 8,150,851 B2
(45) Date of Patent: Apr. 3, 2012

(54) DATA PROCESSING APPARATUS AND METHOD OF PROCESSING DATA

(75) Inventor: Kevin Lloyd Jones, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 794 days.

(21) Appl. No.: 12/258,638

(22) Filed: Oct. 27, 2008

(65) Prior Publication Data

US 2009/0112946 A1 Apr. 30, 2009

Related U.S. Application Data

(60) Provisional application No. 61/000,367, filed on Oct. 25, 2007.

(51) Int. Cl.
*G06F 17/30* (2006.01)

(52) U.S. Cl. .................................................. 707/737

(58) Field of Classification Search .......... 707/737–741, 707/758–761, 769–780; 717/140, 141, 145–150
See application file for complete search history.

(56) References Cited

U.S. PATENT DOCUMENTS

| 5,369,778 | A  | * | 11/1994 | San Soucie et al. ............ 1/1 |
| 5,638,509 | A  |   | 6/1997  | Dunphy |
| 5,990,810 | A  |   | 11/1999 | Williams |
| 6,513,050 | B1 |   | 1/2003  | Williams |
| 6,795,963 | B1 | * | 9/2004  | Andersen et al. ............ 717/130 |
| 6,839,680 | B1 |   | 1/2005  | Liu |
| 6,938,005 | B2 |   | 8/2005  | Iverson |
| 6,961,009 | B2 |   | 11/2005 | McCanne |
| 7,082,548 | B2 |   | 7/2006  | Nakano |
| 7,269,689 | B2 |   | 9/2007  | Eshghi |
| 2001/0010070 | A1 |   | 7/2001  | Crockett |
| 2002/0156912 | A1 |   | 10/2002 | Hurst |
| 2003/0101449 | A1 |   | 5/2003  | Bentolila |
| 2003/0140051 | A1 |   | 7/2003  | Fujiwara |
| 2004/0162953 | A1 |   | 8/2004  | Yoshida |
| 2005/0091234 | A1 |   | 4/2005  | Hsu |
| 2005/0108433 | A1 | * | 5/2005  | Wu et al. .................. 709/246 |
| 2006/0059173 | A1 |   | 3/2006  | Hirsch |
| 2006/0059207 | A1 |   | 3/2006  | Hirsch |
| 2006/0293859 | A1 |   | 12/2006 | Pipke |
| 2007/0220197 | A1 |   | 9/2007  | Lasser |
| 2007/0250519 | A1 |   | 10/2007 | Fineberg |

(Continued)

FOREIGN PATENT DOCUMENTS

WO    2006030326 A1    3/2006

(Continued)

OTHER PUBLICATIONS

Fenstermacher et al.; "Mining Client-Side Activity for Personalization" Department of Management Information Systems, Eller College of Business and Public Administration, University of Arizona, Jun. 2002 (8 pages).

(Continued)

*Primary Examiner* — Wilson Lee

(57) ABSTRACT

Data processing apparatus comprising: a chunk store partitioned into a plurality of chunk sections, at least one section storing specimen data chunks, the processing apparatus being operable to: process input data into one or more input data chunks; identify a chunk section already containing a specimen data chunk corresponding to at least one input data chunk; and store the at least one input data chunk in another chunk section as a specimen data chunk if the identified chunk section has a predetermined characteristic.

12 Claims, 7 Drawing Sheets

U.S. PATENT DOCUMENTS

| | | |
|---|---|---|
| 2007/0250670 A1 | 10/2007 | Fineberg |
| 2008/0126176 A1 | 5/2008 | Iguchi |
| 2009/0077342 A1* | 3/2009 | Chen et al. ............ 711/202 |
| 2009/0112945 A1 | 4/2009 | Camble |
| 2009/0112946 A1 | 4/2009 | Jones |
| 2009/0113167 A1 | 4/2009 | Camble |
| 2010/0198792 A1 | 8/2010 | Camble |
| 2010/0198832 A1 | 8/2010 | Jones |
| 2010/0205163 A1 | 8/2010 | Eshghi |
| 2010/0235372 A1 | 9/2010 | Camble |
| 2010/0235485 A1 | 9/2010 | Lillibridge |
| 2010/0246709 A1 | 9/2010 | Lillibridge |
| 2010/0280997 A1 | 11/2010 | Lillibridge |
| 2010/0281077 A1 | 11/2010 | Lillibridge |
| 2011/0040763 A1 | 2/2011 | Lillibridge |

FOREIGN PATENT DOCUMENTS

| | | |
|---|---|---|
| WO | 2006094365 A1 | 9/2006 |
| WO | 2006094366 A1 | 9/2006 |
| WO | 2006094367 A1 | 9/2006 |
| WO | 2007127248 A2 | 11/2007 |
| WO | 2009054828 A1 | 4/2009 |
| WO | 2009131585 A1 | 10/2009 |

OTHER PUBLICATIONS

Baoyao, Zhou; ""Intelligent Web Usage Mining"" Nanyang Technological University, Division of Information Systems, School of Computer Engineering, 2004 (94 pages).

Baynote Inc.: The Collective Intelligence Platform, Online, http://www.baynote.com/technology/platform/ 2010 (1 page).

Hottolink Inc.; "Recognize" Online, http://www.hottolink.co.jp/english/reconize.html, 2009 (2 pages).

Andrejko et al.: User Characteristics Acquisition from Logs with Semantics, Slovak University of Technology in Bratislava, 2007 (8 pages).

Hongjun Lu et al: Extending a Web Browser with Client-Side Mining, Hong Kong University of Science and Technology Department of Computer Science, Clear Water Bay, Kowloon, Hong Kong, China, 2003 (12 pages).

Shankar et al.; ""Personalized Web Search Based on Client Side Ontology"", CS 498 B Tech Project,10. IIT Kanpur, India 2010 (9 pages).

Sendhikumar et al.; "Personalized ontology for web search personalization" Anna University, Chennai, India , 2008 (7 pages).

Shahabi et al.; "Yoda an Accurate and Scalable Web based Recommendation System?" University of SouthernCalifornia, Los Angeles, Sep. 2001 (14 pages).

Why Wubat? Website User Behavior & Analysis Tool, Wubat, Online, http://www.wubatcom/ dated on or before Oct. 12, 2010 (3 pages).

Claypool et al.; "Implicit Interest Indicators", Worcester Polytechnic Institute, Worcester, Computer Science Department Worcester Polytechnic Institute Worcester, MA 01609, USA., 2001 (8 pages).

Shahabi et al.; A Framework for Efficient and Anonymous Web Usage Mining Based on Client-Side Tracking. University of Southern California, Los Angeles, 2002 (48 pages).

Clattertrap; Online http://www.clattertrap.com; Jul. 20, 2010 (1 page).

HSNW: SRI defense technology spawns civilian application: published Jun. 29, 2010 (2 pages).

Anthony Ha: Facebook investor backs Chattertrap, a personal assistant for content, Jun. 28, 2010 (6 pages).

Muthitacharoen Athicha, et al., "A Low-Bandwidth Network File System," Proceedings of the 18th ACM Symposium on Operating Systems Principles (SOSP '01), Oct. 2001.

L. L. You and C. Karamanolis. Evaluation of Efficient Archival Storage Techniques. In Proceedings of the 21st IEEE / 12th NASA Goddard Conference on Mass Storage Systems and Technologies, pp. 227-232, College Park, Maryland, Apr. 2004.

You L. L. et al., "Deep Store an Archival Storage System Architecture" Data Engineering, 2005 ICDE 2005 Proceedings. 21st. intl Conf on Tokyo, Japan, Apr. 5-8, 2005, pp. 12.

Eshghi et al., "Jumbo Store: Providing Efficient Incremental Upload and Versioning for a Utility Rendering Service," 2007 (16 pages).

Brin, Sergey, et al., "Copy Detection Mechanisms for Digital Documents", Department of Computer Science. Stanford University, Oct. 31, 1994, p. 1-12.

Manber, Udi, "Finding Similar Files in a Large File System," Department of Computer Science University of Arizona TR 93-33, Oct. 1993, (11 pages).

Rabin, M.O., "Fingerprinting by Random Polynomials," Technical Report, Center for Research in Computing Technology, Harvard University, 1981, Report TR-15-81 (14 pages).

* cited by examiner

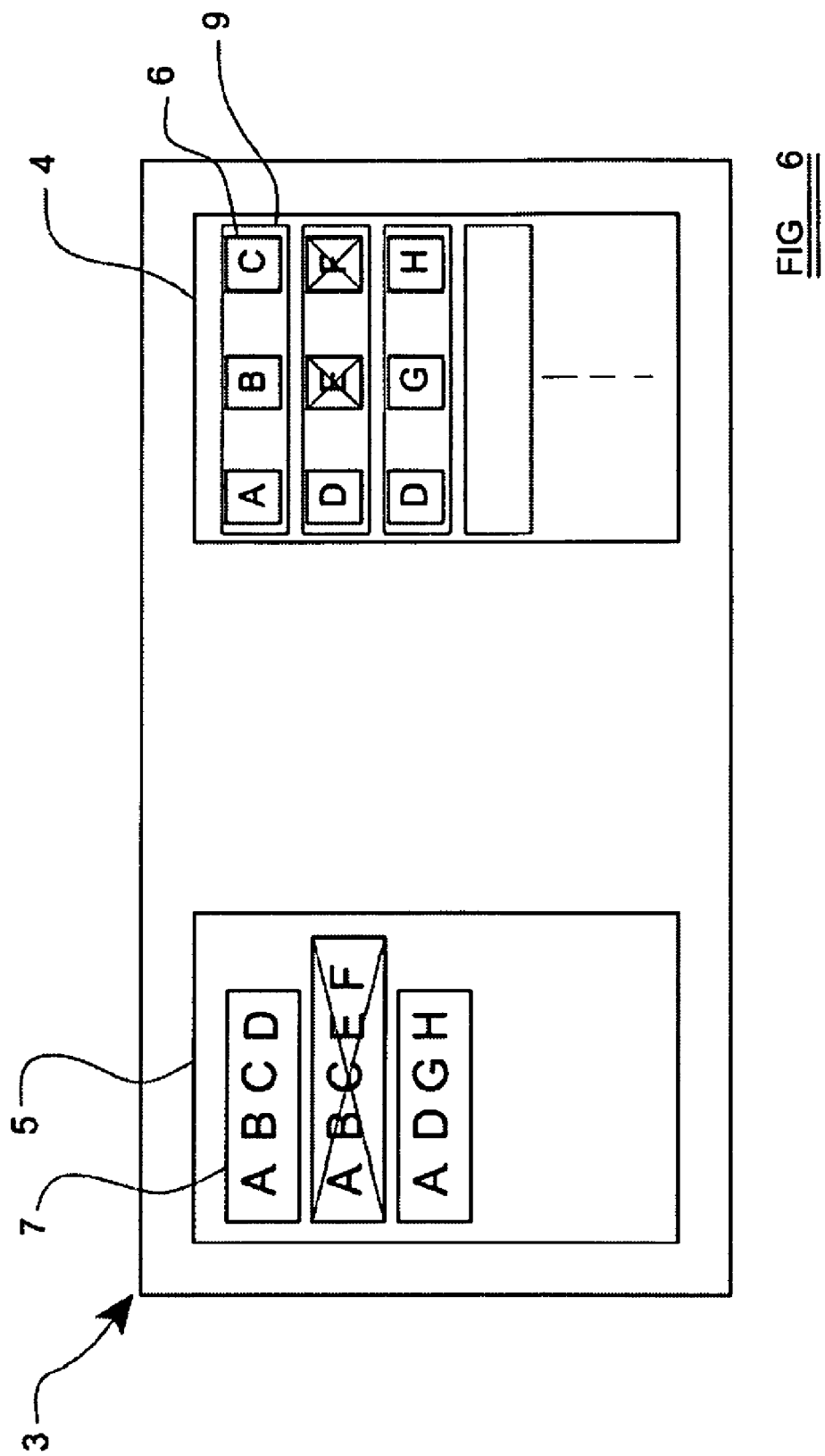

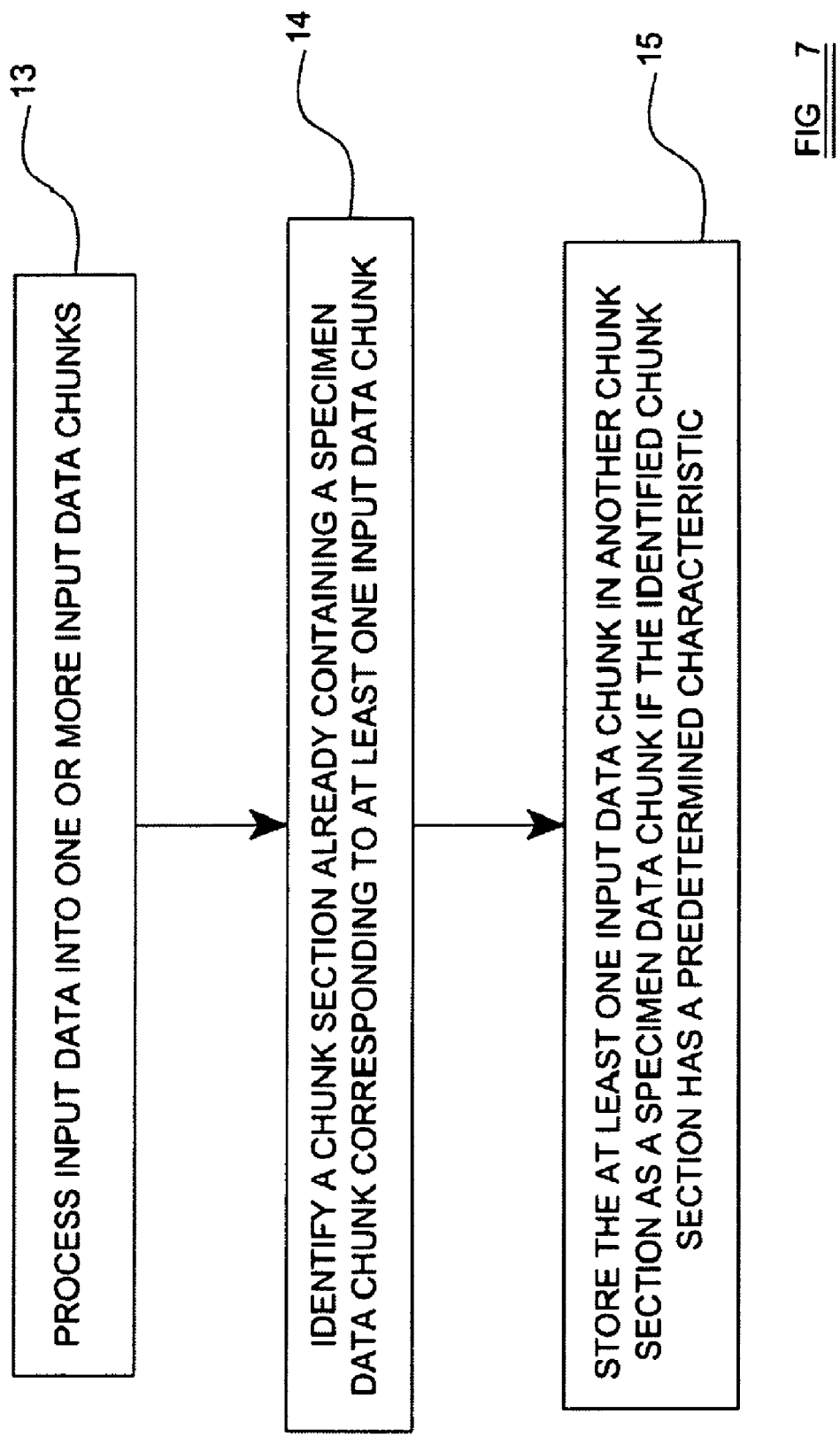

DATA PROCESSING APPARATUS AND METHOD OF PROCESSING DATA

CROSS-REFERENCE TO RELATED APPLICATION

This Utility Patent Application is based on and claims the benefit of U.S. Provisional Application No. 61/000,367, filed on Oct. 25, 2007 the contents of which are hereby incorporated by reference in their entirety.

BACKGROUND OF THE INVENTION

Data held on a primary data storage medium may be backed-up to secondary data storage medium. The secondary data storage medium may be in a different location to the primary data storage medium. Should there be at least a partial loss of the data on the primary data storage medium, data may be recovered from the secondary data storage medium. The secondary data storage medium may contain a history of the data stored on the primary data storage medium over a period of time. On request by a user, the secondary data storage medium may provide the user with the data that was stored on the primary data storage medium at a specified point in time.

Data back-up procedures may be carried out weekly, daily, hourly, or at other intervals. Data may be backed-up incrementally, where only the changes made to the data on the primary data medium since the last back-up are transferred to the secondary data storage medium. A full back-up may also be performed, where the entire contents of the primary data medium are copied to the secondary data medium. Many other back-up strategies exist.

When backing-up data, a particular part of the data being backed-up may have previously been stored to the primary data storage medium, which may especially be the case when full back-ups are carried out. Storing the same data numerous times represents an inefficient use of a data storage medium.

SUMMARY OF THE INVENTION

One embodiment of the present invention provides data processing apparatus comprising: a chunk store partitioned into a plurality of chunk sections, at least one section storing specimen data chunks, the processing apparatus being operable to: process input data into one or more input data chunks; identify a chunk section already containing a specimen data chunk corresponding to at least one input data chunk; and store the at least one input data chunk in another chunk section as a specimen data chunk if the identified chunk section has a predetermined characteristic.

In one embodiment, the data processing apparatus further comprises a manifest store, containing at least one manifest that represents at least a part of a data set and that comprises at least one reference to at least one specimen data chunk stored in the chunk store.

In one embodiment, the data processing apparatus further comprises a chunk index containing information on at least one specimen data chunk, the processing apparatus being operable to use the chunk index to identify said chunk section already containing a specimen data chunk corresponding to at least one input data chunk.

In one embodiment, the predetermined characteristic is that the identified chunk section is fragmented to at least a predetermined extent.

In one embodiment, the predetermined characteristic is that a predetermined number or size of specimen data chunks stored in the identified chunk section are non-contiguous with one another.

In one embodiment, the predetermined characteristic is that the specimen data chunks corresponding to other input data chunks of the input data being processed are stored in more than a predetermined number of chunk sections.

In one embodiment, the predetermined characteristic is that the specimen data chunks in the identified chunk section have been referenced by fewer than a predetermined number of the most recent M manifests to be compiled.

In one embodiment, the predetermined characteristic is that fewer than a predetermined number of specimen data chunks in the identified chunk section correspond to input data chunks of the input data set being processed.

In one embodiment, the predetermined characteristic is that fewer than a predetermined number of manifests in the manifest store contain a reference to the said corresponding specimen chunk in the identified chunk section.

In one embodiment, if the identified chunk section has said predetermined characteristic, and a subsequent input data chunk is found to correspond to said specimen data chunk in said another chunk section, the data processor is operable to compile a manifest with a reference to the said specimen data chunk stored in the said another chunk section.

In one embodiment, if the identified chunk section has said predetermined characteristic, the data processor is operable not to compile subsequent manifests with references to the said identified chunk section.

In one embodiment, if the identified chunk section has said predetermined characteristic, the data processor is operable to store at least one further specimen data chunk of the identified chunk section in the said another chunk section.

In one embodiment, if the identified chunk section does not have a predetermined characteristic, the data processing apparatus is operable to compile a manifest with a reference to the specimen data chunk in the identified manifest.

Another embodiment of the present invention provides a data processor comprising: a plurality of chunk sections, at least one section storing specimen data chunks, a separate manifest store, containing at least one manifest that represents at least a part of a data set and that comprises at least one reference to at least one specimen data chunk stored in a chunk section, the processing apparatus being operable to: process input data into one or more input data chunks; identify a chunk section already containing a specimen data chunk corresponding to at least one input data chunk; and store the at least one input data chunk in another chunk section as a specimen data chunk if the identified chunk section is fragmented to at least a predetermined extent.

Another embodiment of the present invention provides data processing apparatus comprising: a chunk store partitioned into a plurality of chunk sections, each section configured to store specimen data chunks, a manifest store, containing at least one manifest that represents at least a part of a data set and that comprises at least one reference to at least one specimen data chunk stored in the chunk store, the processing apparatus being operable to: process input data into one or more input data chunks; identify a chunk section already containing a specimen data chunk corresponding to at least one input data chunk and references by at least one manifest in the manifest store; and compile a manifest with a reference to the specimen data chunk of the identified chunk section unless the identified chunk section has a predetermined characteristic.

Another embodiment of the present invention provides A method of processing data, using: a chunk store partitioned into a plurality of chunk sections, at least one section storing specimen data chunks, a manifest store, containing at least one manifest that represents at least a part of a data set and that comprises at least one reference to at least one specimen data chunk stored in the chunk store, the method comprising: processing input data into one or more input data chunks; identifying a chunk section already containing a specimen data chunk corresponding to at least one input data chunk; and storing the at least one input data chunk in another chunk section as a specimen data chunk if the identified chunk section has a predetermined characteristic.

In one embodiment using a chunk index containing information on at least one specimen data chunk, the method further comprises using the chunk index to identify said chunk section already containing a specimen data chunk corresponding to at least one input data chunk.

In one embodiment, the method comprises compiling a manifest with a reference to the said another chunk section if the identified chunk section has the predetermined characteristic.

In one embodiment, subsequent manifests are not compiled with references to the identified chunk section if the identified chunk section has the predetermined characteristic.

Another embodiment of the present invention provides A method of processing data using: a chunk store partitioned into a plurality of chunk sections storing specimen data chunks, the method comprising: processing input data into input data chunks; identifying a specimen data chunk in a chunk section corresponding to an input data chunk; and compiling a manifest with a reference to the specimen data chunk unless the chunk section containing the identified specimen data chunk has a predetermined characteristic.

BRIEF DESCRIPTION OF THE DRAWINGS

Embodiments of the invention will now be described, by way of example only, with reference to the accompanying drawings, in which:

FIG. 6 shows a schematic representation of yet another data processing apparatus embodying the present invention, in use.

FIG. 7 shows a flow chart of a method of the present invention.

DETAILED DESCRIPTION

Figure 1:
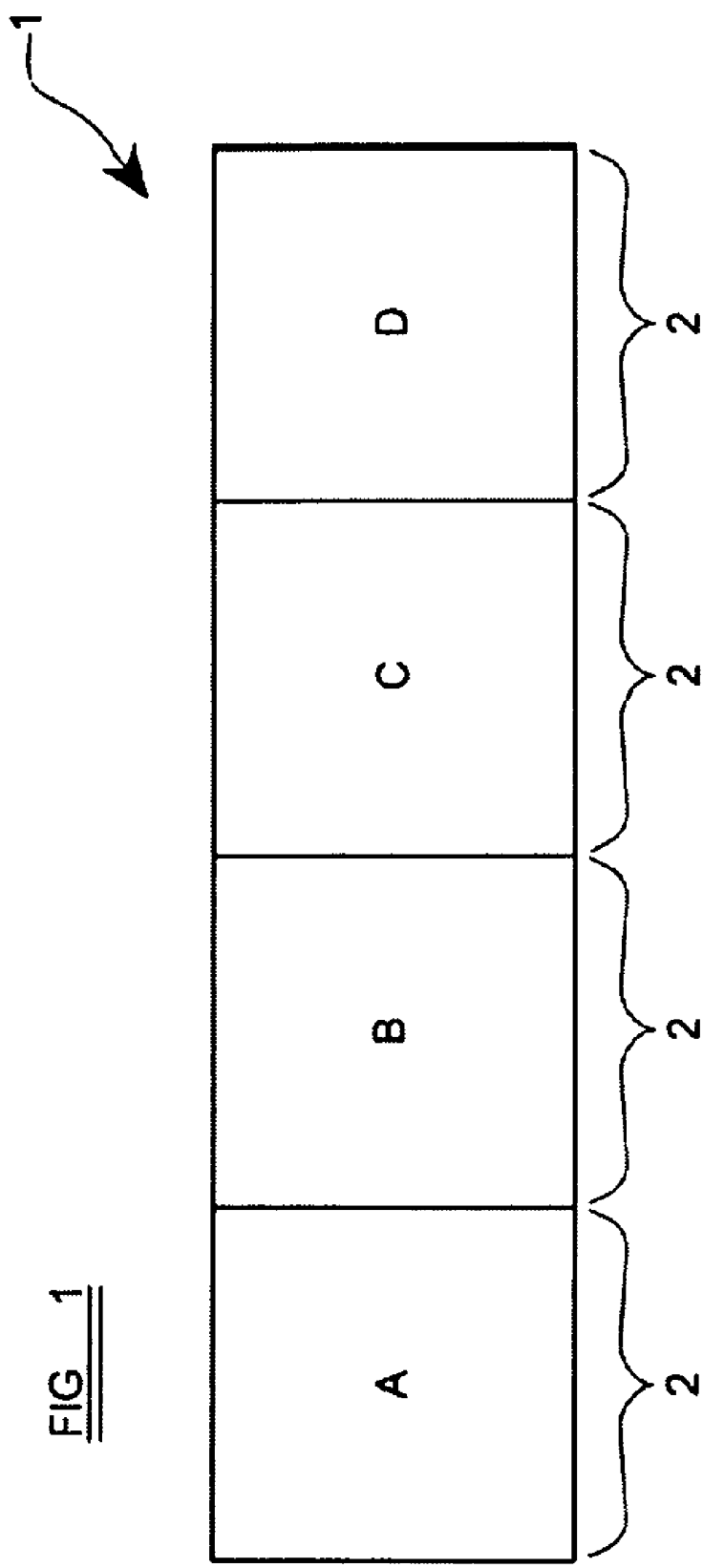
FIG. 1 shows a schematic representation of a data set.

FIG. 1 shows a schematic representation of a data set 1. A data set 1 may be shorter or longer than that shown in FIG. 1. A data set 1 comprises an amount of data, which may be in the order or 10 bytes, 1000 bytes, or many millions of bytes. A data set may represent all the data for a given back-up operation, or at least a part of a larger data set.

A back-up data set may comprise a continuous data stream or a discontinuous data stream. Whichever, the data set may contain many distinct, individual files or parts of files. The data set may not be partitioned into the individual files it contains. The data set may contain embedded information, comprising references to the boundaries of the individual files contained in the data set. The data set may then more easily be dissected into its constituent components. The size of the embedded information may represent a significant portion of the total data. Backing-up data with embedded file information increases the required capacity of the data storage medium.

Data processing apparatus embodying the present invention is operable to process an input data set into one or more input data chunks. An input data set may be divided into a plurality of input data chunks. Each input data chunk may represent an individual file, a part of an individual file, or a group of individual files within the input data set. The data set may be processed into input data chunks based on properties of the input data as a whole, with little or no regard to the individual files contained therein. The boundaries of data chunks may or may not be coterminous with file boundaries. The data chunks may be identical or varying in size.

FIG. 1 illustrates a schematic representation of an input data set 1 processed into data chunks 2. For convenience, each input data chunk is labelled in FIG. 1 from A to D, identifying that the data chunks 2 are distinct from one another. The input data set 1 may be divided into more input data chunks 2 than those shown in FIG. 1. An input data set 1 may be many terabytes in size, and be processed into 1 billion input data chunks. There are specific schemes available to the skilled person to determine how the input data set 1 is processed into input data chunks 2 and which information each input data chunk 2 contains.

Figure 2:
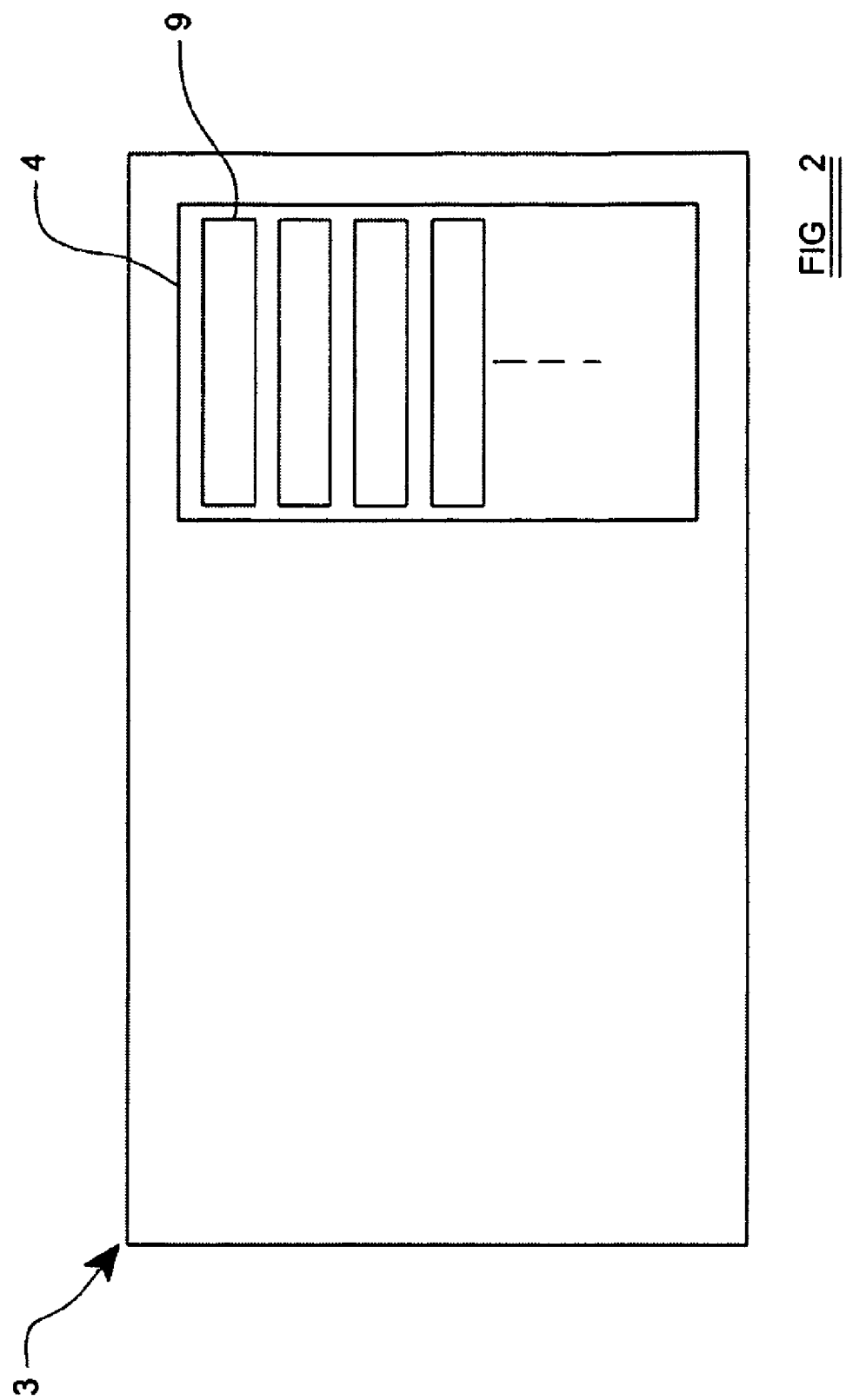
FIG. 2 shows a schematic representation of data processing apparatus embodying the present invention.

FIG. 2 shows data processing apparatus 3 embodying the present invention, comprising a chunk store 4. As an input data set 1 is processed by data processing apparatus 3 embodying the present invention, the input data chunks 2 are stored to the chunk store 4 as specimen data chunks 6. A specimen data chunk 6 is a carbon copy of an input data chunk 2. The chunk store 4 may store a plurality of specimen data chunks 6. The chunk store 4 may contains all the input data chunks 2 that have been previously processed by the data processing apparatus 3.

The chunk store 4 is partitioned into a plurality of chunk sections 9, as shown in FIG. 2. In one embodiment, the chunk sections 9 are configured so as to store a predetermined number of specimen data chunks 6. In another embodiment, the chunk sections 9 are configured as to store a predetermined total size of specimen data chunks 6. In other words, a chunk section 9 may only be operable to contain specimen data chunks 6 to a predetermined data capacity. It should be appreciated that, in use, as the chunk sections 9 are filled with specimen data chunks 6, further chunk sections may be created for subsequent use. Alternatively, a chunk store may be partitioned into chunk sections 9 from the outset. The configuration of the chunk store 5 may be dynamic, and may allow extra capacity to be added during use.

The chunk sections 9 may not be physically separate from one another. In one embodiment, the chunk sections 9 may be contiguous with one another in the memory in which the chunk store is provided. The boundaries of the chunk sections 9 may be indicated by markers or reference points. The chunk sections 9 may be configured before or after the addition of specimen data chunks 6 to the chunk store 4. In one embodiment, chunk sections 9 may be logically ordered so as to be contiguous but physically non-contiguous.

Figure 3:
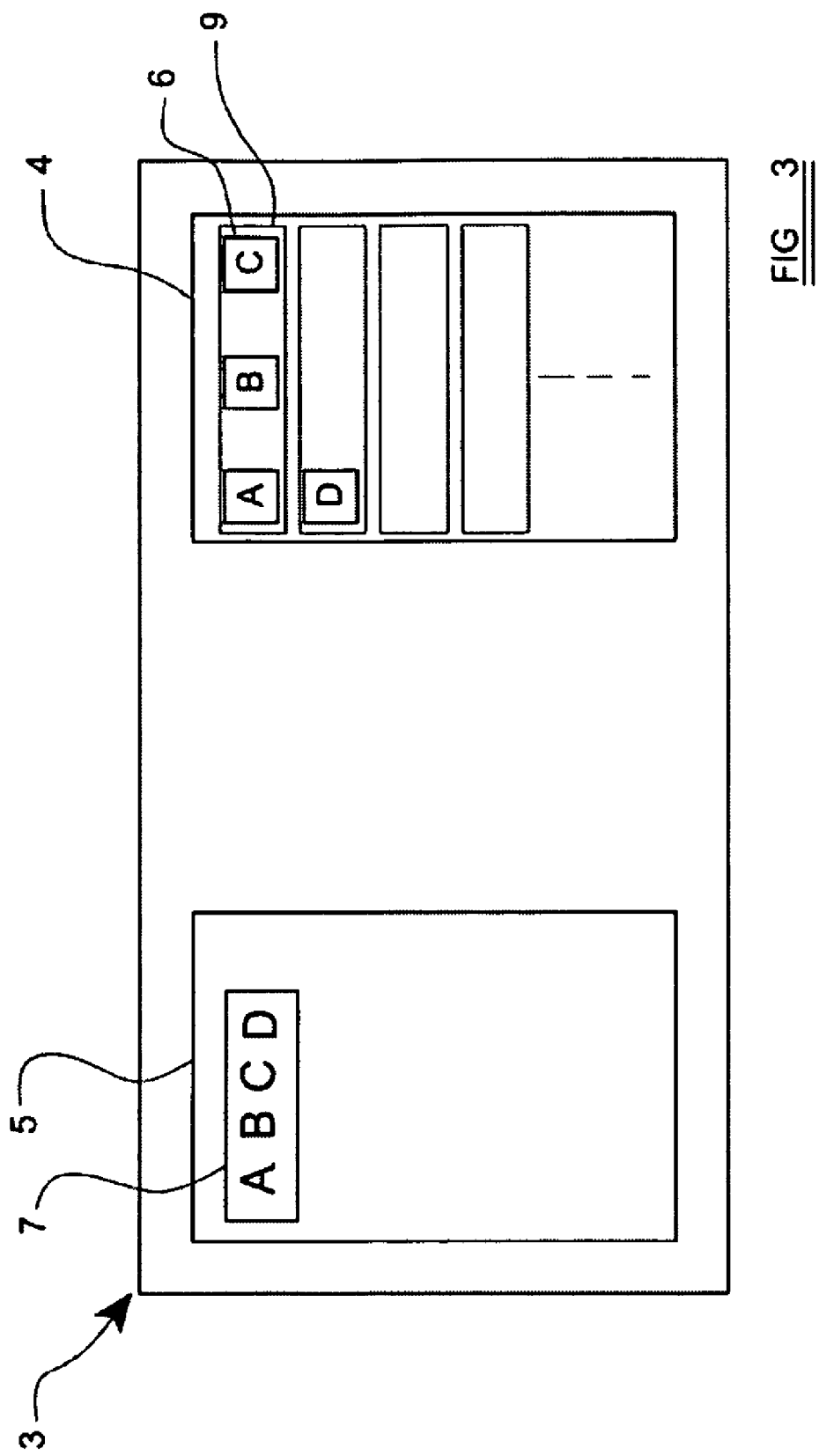
FIG. 3 shows a schematic representation of the data processing apparatus of FIG. 2, in use.

FIG. 3 shows data processing apparatus 3 embodying the present invention. The data processing apparatus 3 comprises a chunk store 4, partitioned into chunk sections 9, and a manifest store 5. The manifest store 5 may be discrete from, and separate to, the chunk store 4 but both stores 4, 5 may reside on a common data storage medium or memory device. In one embodiment, both the chunk store 4 and manifest store 5 are stored in non-volatile storage.

As an input data set 1 is processed by data processing apparatus 3 embodying the present invention, the input data chunks 2 are stored to the chunk store 4 as specimen data chunks 6, as shown schematically in FIG. 3. The first three specimen data chunks A, B and C have been added to the first chunk section 9. As the capacity of the first chunk section 9 was reached, the subsequent specimen data chunk, D, is stored in the second chunk section 9. It should be appreciated that FIG. 3 is schematic and shown for example only. In some embodiments, each chunk section may be configured to store many hundreds or thousands of specimen data chunks.

As an input data chunk 2 is added to the chunk store 4 as a specimen data chunk 6, a manifest 7 is compiled. A manifest 7 is a representation of a data set 1. The manifest 7 comprises references to specimen data chunks 6 in the chunk store 4 which correspond to the input data chunks 2 comprising the input data set 1. So, the references of the manifest 7 may be seen as metadata to specimen data chunks 6. If the references to specimen data chunks 6 of a given manifest 7 are smaller in size than the specimen data chunks 6 referred to by the manifest 7, then it will be appreciated that a manifest 7 may be smaller in size than the input data set 1 it represents.

In one embodiment, a reference in the manifest 7 may not be made to the specimen data chunk 6 directly, but to the chunk section 9 containing that specimen data chunk. There may be maintained a record of the location of specimen data chunks 6 within chunk section 9. An advantage of such an embodiment may be that since there are likely to be fewer chunk sections 9 than possible specimen data chunks 6, the size of the reference to the chunk sections 9 may be smaller in size than a reference to a specimen data chunk 6. Consequently, the size of the references in the manifest may be smaller, requiring less memory to store a manifest. In this specification when a reference to a specimen data chunk is described, it is to be appreciated that a reference to the chunk section containing that specimen data chunk is equally applicable. The two embodiments may be described interchangeably for the sake of brevity; but are both applicable to embodiments of the present invention.

When an input data set 1 has been processed into input data chunks 2 and a manifest 7 compiled, representing the input data set 1, the manifest 7 is stored in the manifest store 5, as shown schematically in FIG. 3.

If a user of data processing apparatus 3 embodying the present invention wishes to recover the data of a given input data set 1 □ which may relate to a back-up made at a particular point in time— the user will retrieve the corresponding manifest 7 from the manifest store 5. Each reference in the manifest 7 to specimen data chunks 6 in the chunk store 4 is then used to reconstruct the original data set 1.

Figure 4:
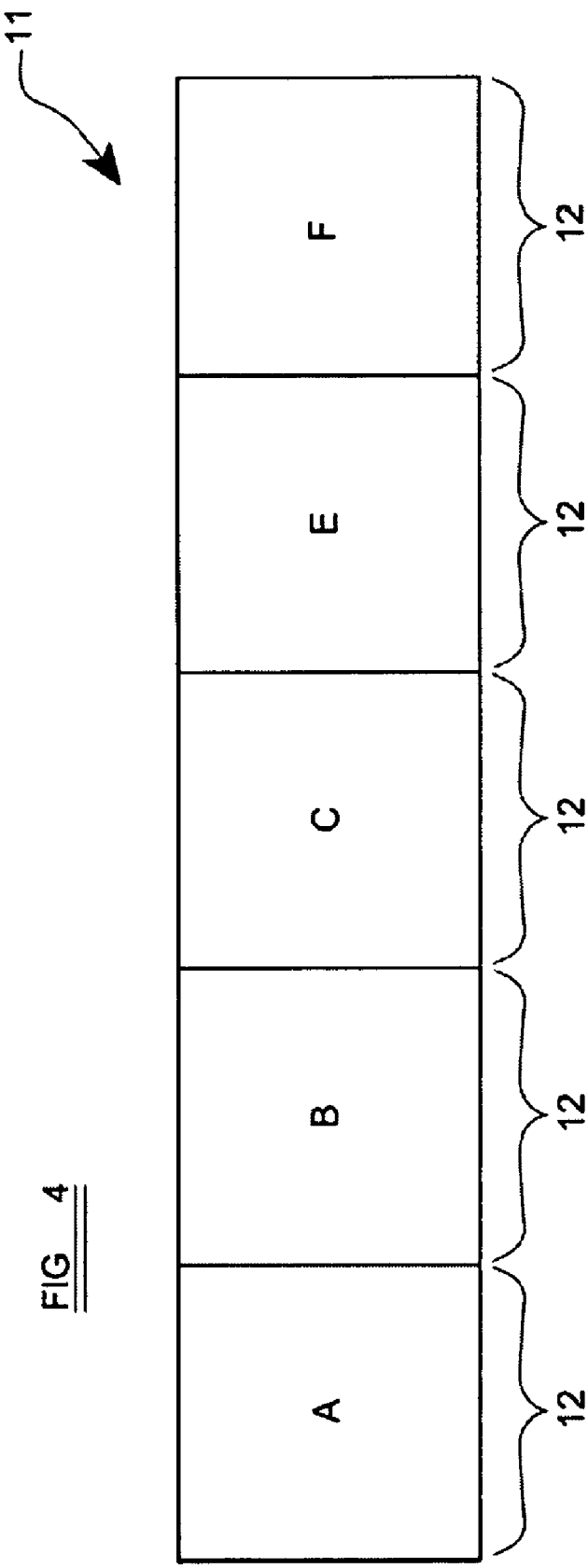
FIG. 4 shows a schematic representation of another data set.

A schematic representation of a second input data set 11 to be processed is illustrated in FIG. 4. Without data processing apparatus 3 embodying the present invention, the second input data set 11 may be stored in its entirety. Thus, even though both input data sets 1, 11 comprise the common input data chunks A, B and C, both occurrences of each would be stored, which may be an inefficient use of a data storage medium.

With data processing apparatus 3 embodying the present invention, when the input data set 11 is presented to the data processing apparatus 3, the input data set 11 is processed into input data chunks 12. Data processing apparatus 3 embodying the present invention is operable to identify that specimen data chunks already exist in the chunk store 4 which correspond to input data chunks 12 of input data set 11. Consequently, those input data chunks may not be stored again in the chunk store 4 as specimen data chunks. A manifest for the input data set 11 may be compiled with references to the corresponding specimen data chunks 6 already stored in the chunk store 4.

In one embodiment, the data processing apparatus is operable to identify at least one manifest 7 in the manifest store 5 that includes at least one reference to a specimen data chunk 6 corresponding to at least one of the input data chunks 12 of the second input data set 11. When processing the input data set 11 illustrated in FIG. 4, data processing apparatus 3 embodying the present invention may identify that the manifest 7 stored in the manifest store 5 includes a reference to a specimen data chunk 6 corresponding to at least one of the input data chunks 12. In this example, the data processing apparatus may identify that the manifest 7 includes references to specimen data chunks A, B and C. After so identifying, the data processing apparatus 3 will not store the input data chunks A, B and C again in the chunk store 4, because they already exist therein as specimen data chunks 6. Instead, the manifest compiled for the input data set 11 may comprise references to specimen data chunks A, B and C already in the chunk store 4.

Figure 5:
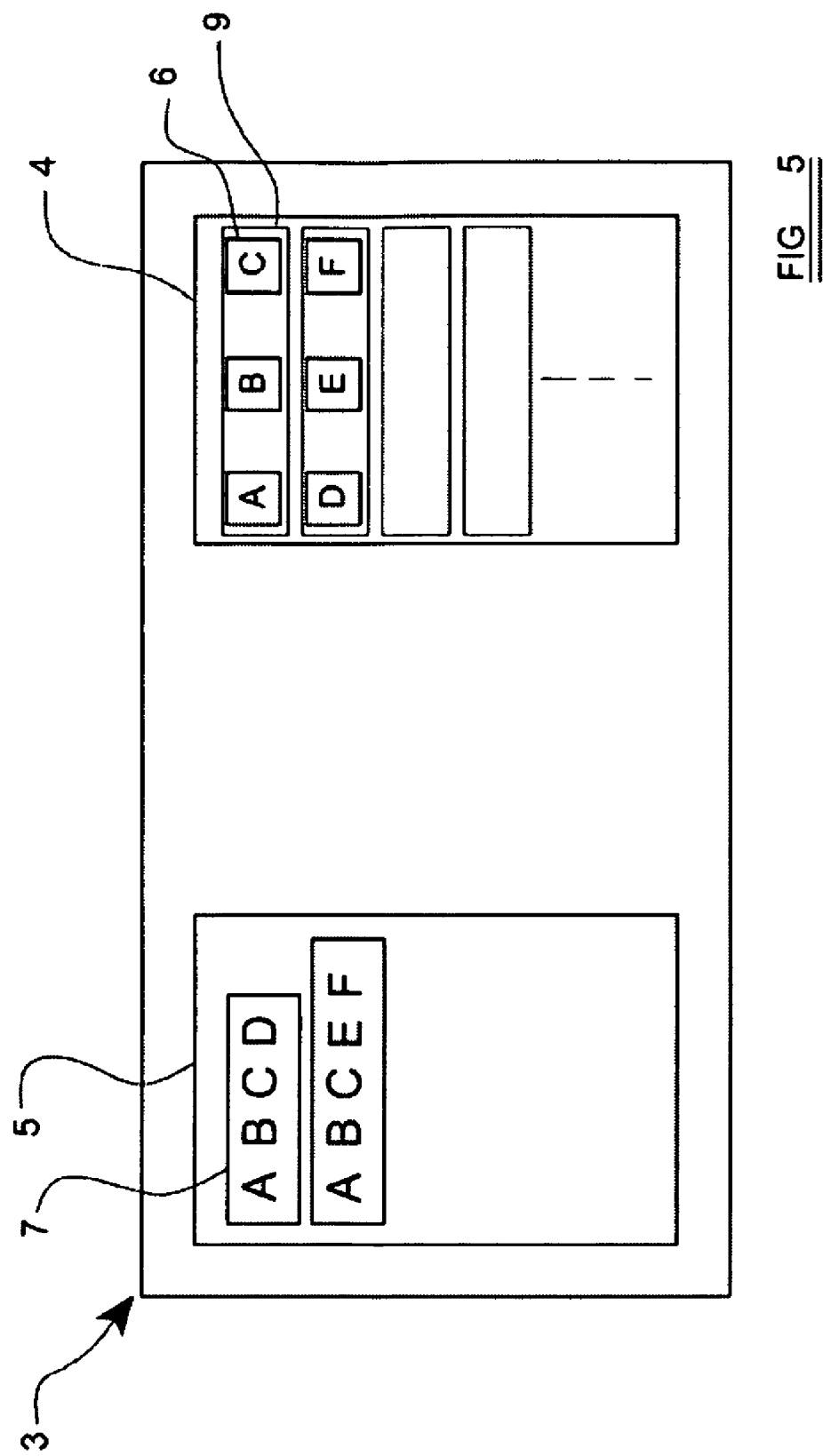
FIG. 5 shows a schematic representation of another data processing apparatus embodying the present invention, in use.

It will be noted that the chunk store 4 does not contain specimen data chunks 6 corresponding to input data chunks E and F. Similarly, the manifest 7 in the manifest store 5 does not contain references to specimen data chunks 6 corresponding to input data chunks E and F. Data processing apparatus embodying the present invention is operable to determine that the chunk store 4 does not already contain specimen data chunks 6 corresponding to input data chunks E and F. Accordingly, data processing apparatus 3 embodying the present invention may store the input data chunks E and F as specimen data chunks 6 in the chunk store 4. In an embodiment, specimen data chunks are added to one of the chunk sections 9 of the chunk store 4. In the example shown in FIG. 5, the specimen data chunks E and F have been added to the second chunk section 9 of the chunk store 4. The manifest for the input data set 11 of FIG. 4 is then completed by adding references to specimen data chunks E and F. The new manifest is then added to the manifest store 5, as shown in FIG. 5.

In one embodiment, for each input data set processed, data processing apparatus embodying the present invention may store only one occurrence of each input data chunk as a specimen data chunk in the chunk store. Some duplication of input data chunks as specimen data chunks may be permitted.

There are various methods available to the skilled person for determining that a chunk store contains a specimen data chunk corresponding to an input data chunk. These methods are not described in detail in this specification. Further, how the data processing apparatus embodying the present invention identifies a chunk section containing a particular specimen data chunk corresponding to an input data chunk is not detailed herein, as methods thereof are available to the skilled person.

In some embodiments, after a predetermined period of time or a prespecified event, there may no longer be a need to store a manifest for a particular data set. For example, where the manifests represent back-ups of a data store, the back-up strategy may require that back-up data is only stored for a predetermined time. For example, there may be a requirement only for the data in the past week to be backed up. Any back-ups relating to data older than a week may be deleted to save back-up memory space □ and because a user may no longer require the back-up data older than a week. In another embodiment, the older the back up data is, the fewer back-ups the processing apparatus may store for a given time period. For example, there may be stored hourly back-ups for the previous 24 hours, daily back-ups for the previous week, then monthly back-ups for the previous year. As time progresses, all but 23 of the hourly back-ups may be deleted, with the one remaining back-up becoming the daily back-up. Back-ups may therefore be managed according to their age and/or deemed importance.

Physical Fragmentation

It will be appreciated that the deletion of a data set involves the deletion of the corresponding manifest in the manifest store. By deleting a given manifest in the manifest store, the references to specimen data chunks in the chunk store will also be deleted. However, the specimen data chunks themselves, referenced by the deleted manifest may not necessarily be deleted. This is because those specimen data chunks may be referenced by other manifests remaining in the manifest store. However, should the chunk store contain a specimen data chunk which is exclusively referenced by the deleted manifest, then that specimen data chunk may also be deleted. This is because the data in the specimen data chunk being deleted is not found in any of the data sets represented by the manifests still stored in the manifest store. The deleted specimen data chunk may therefore be of no relevance.

In another embodiment, when a manifest is deleted which exclusively references a given specimen data chunk, the specimen data chunk may not immediately be deleted from the chunk store but may be deleted after a predetermined period of time or number of iterations. An advantage of this is that even though there are currently no manifests in the manifest store which reference the specimen data chunk, there may later be a new input data set processed by the data processing apparatus which does contain an input data chunk corresponding to the specimen data chunk. Indeed, since a previously processed and stored (and now deleted) input data set comprised an input data chunk corresponding to that specimen data chunk, it is likely that a future input data set to be processed may also comprise an input data chunk corresponding to that specimen data chunk □ in other words; if it has been seen before, it may be seen again.

In one embodiment, the said specimen data chunk may not be deleted but moved to a secondary chunk store, for occasional reference by data processing apparatus embodying the present invention. For example, when data processing apparatus embodying the present invention processes an input data set and determines that there is not already a specimen data chunk in the main chunk store corresponding to a given input data chunk of the input data set, then data processing apparatus embodying the present invention may explore the or secondary chunk store to determine if a specimen data chunk corresponding to the input data chunk already exists therein. Only if a specimen data chunk does not exist in the secondary chunk store corresponding to the input data chunk, may the input data chunk be added to the main chunk store as a new specimen data chunk.

With reference to FIG. 5, suppose that the manifest ABCEF is deleted, since the data set which it represents is no longer required to be stored by data processing apparatus embodying the present invention. It should be noted that the strategy of exactly when or why a manifest is deleted from the manifest store is not detailed herein.

The first part of the manifest comprises references to specimen data chunks A, B and C. It will be noted by the reader that there are references to the specimen data chunks in the first manifest (ABCD) already stored in the manifest store 5. Thus, since manifest ABCD is not being deleted, at this time, then the specimen data chunks A, B and C should be maintained in the chunk store 4, so that the data represented by manifest ABCD can be restored if needed. However, it will be noted that manifest ABCEF references exclusively the specimen data chunks E and F in the chunk store 4. Thus, by deleting manifest ABCEF, there is no longer a need to store specimen data chunks E and F in the chunk store 4. In other words, specimen data chunks E and F are exclusively referenced by manifest ABCD.

Accordingly, in one embodiment, specimen data chunks E and F may be deleted from chunk store 4. In another embodiment, specimen data chunks E and F may be moved to a secondary chunk store, as described above. It should be appreciated that in embodiments comprising a secondary chunk store, the secondary chunk store may not necessarily be physically separate to the main chunk store 4. Both the main chunk store 4 and secondary or subsequent chunk store may be configured on a single data store. The boundaries of the chunk store and subsequent or secondary chunk stores may be determined by reference points or boundaries in the larger data store.

In one embodiment, referring to FIG. 5, as a result of deleting specimen data chunks E and F from chunk store 4, it will be noted that the second chunk section 9 of the chunk store 4 now contains only one specimen data chunk D. In an embodiment of the present invention, the data processing apparatus is configured so that new specimen data chunks being added to the chunk store4 may not be added in the □Space□created by deleted specimen data chunks. For example, when a chunk section 9 has been filled with a number of specimen data chunks 6, no more specimen data chunks may be added to that chunk section, even if one or more of the specimen data chunks is deleted from the chunk section. Such an arrangement is advantageous since it may maintain the security of the specimen data chunks stored in the chunk store.

Suppose that data processing apparatus does allow for new specimen data chunks to be added to the free space in a chunk section which previously contained other specimen data chunks. By adding those specimen data chunks to the chunk section, the security of the data held in the chunk section, as a whole, may be compromised. The existing specimen data chunks may become corrupted. The new specimen data chunks may not □fit□in the free space. In one arrangement, remaining specimen data chunks may be moved within the chunk section to be contiguous. Such read/write operations may cause loss of data should the operation be prematurely terminated (as a result of loss of power, for example).

In an approved arrangement, the existing specimen data chunks in the chunk section may instead be copied to a new, empty, chunk section, and the new specimen data chunks stored in the new chunk section. As a result, the security of the original chunk section may not be compromised, since no writing of data to the original chunk section is performed. Instead, the new chunk section makes a mirror copy of the original chunk section, and it is to the new, mirror copy, chunk section to which the new specimen data chunks are added. However, such an arrangement could impose performance penalties and naturally creates duplicated specimen data chunks.

In another arrangement, suppose that data processing apparatus has highlighted, say, 50 new specimen data chunks which need to be added to the chunk store. In one arrangement, each of the specimen data chunks may be added to the □empty spaces□in each of the chunk sections, caused by the previous removal of other specimen data chunks. Depending on the size of the existing chunk sections, and the □empty spaces□therein, the 50 new specimen data chunks may be stored in a large number of separate chunk sections in the chunk store. Assuming that the 50 specimen data chunks correspond to input data chunks of an input data set being processed, it will be appreciated that the resultant manifest for the input data being processed will contain references to a plurality of chunk sections in the chunk store.

In one embodiment of the present invention, the chunk store 4 is stored in non-volatile memory, for example on disc or tape. Reading or writing data to the disc or tape requires access to particular physical areas of the disc or tape. It will be appreciated that where the chunk sections are configured to be stored in a contiguous relationship on the disc or tape, access to a plurality of different and separated chunk sections will require multiple read/write operations to be performed on the disc or tape, in order to read the data. Thus, when restoring a data set whose manifest contains references to specimen data chunks stored in a plurality of chunk sections, which may be distributed across the disc or tape, the restoration process may take significant time to allow for the plurality of read/write operations to be performed.

In an embodiment, the data processing apparatus is configured so that subsequent specimen data chunks may not be added to □free space□in a chunk section which previously contained a specimen data chunk. Of course, it will be appreciated that if a given chunk section never reached its capacity of specimen data chunks, then subsequent specimen data chunks may still be added to the chunk section, but not in the spaces previously containing the deleted specimen data chunks.

In an abstract sense, it may be considered that when a specimen data chunk is deleted from the chunk store, a □ghost□specimen data chunk is left in its place. In one embodiment of the present invention, the data processing apparatus is configured so that specimen data chunks may not be stored in a location in a chunk section having a ghost specimen data chunk.

With further reference to FIG. 5, and still assuming the deletion of the manifest ABCEF, it will be noted that the second chunk section only contains specimen data chunk D. Thus, should any subsequent input data sets processed by the data processing apparatus comprise an input data chunk corresponding to specimen data chunk D, the corresponding manifest will be compiled with a reference to specimen data chunk D (or the second chunk section as a whole). Since there are no other specimen data chunks stored in the second chunk section □ and the storing of subsequent specimen data chunks in the second chunk section is not allowed because the second chunk section contains ghost specimen data chunks □ then it will be appreciated that the reference to the second chunk section is only useful to the extent that it contains specimen data chunk D. Consequently, in an embodiment where the chunk store is stored on disc or tape media, every occasion where the second chunk section or specimen data chunk D stored therein needs to be accessed, will require a read/write operation of the part of the tape or disc media comprising the second chunk section. Since there is only one specimen data chunk stored in the second chunk section, the read/write operation may not be utilised to retrieve other specimen data chunks. This may be an inefficient use of the chunk store and may increase processing times as a result of the increase in the number of read/write operations.

With further reference to FIG. 5, and the above-noted example of having deleted manifest ABCEF from the manifest store, it will be noted that specimen data chunks E and F deleted from the second chunk section of the chunk store 4 were contiguous with one another. However, it will readily be appreciated that the locations of deleted specimen data chunks in a chunk section may be spread across the chunk section. Although the schematic example representation in FIG. 5 of a chunk section contains only three specimen data chunks, it will be appreciated that, in practice, each chunk section may contain many hundreds or thousands of specimen data chunks.

When specimen data chunks are deleted from a chunk section, it may be said that the chunk section becomes □physically fragmented□. The level of fragmentation may depend on the number of remaining specimen data chunks and/or the distance or average distance between the remaining specimen data chunks. The fragmentation may be measured on the average size of the spaces between the remaining specimen data chunk. In some embodiments, it is unlikely that any removed specimen data chunks will be contiguous with one another. Likewise, it is unlikely, in practice, that any remaining specimen data chunks will all be contiguous with one another. As more and more manifests are deleted, along with specimen data chunks exclusively referenced by the deleted manifests, then a chunk section may become even more physically fragmented.

An example of physical fragmentation may be explained with reference to FIG. 6. Referring to the figure, it will be noted that a new manifest ADGH has been added to the manifest store 5. Also, as described above with reference to FIG. 5, the previously stored manifest ABCEF has been deleted. This is illustrated in FIG. 6 by striking through the manifest ABCEF and the redundant specimen data chunks E and F in the chunk store.

In processing an input data set comprising input data chunks ADGH, it may be recognised by data processing apparatus embodying the present invention that specimen data chunk A already exists in the chunk store. Thus, a manifest for the new input data sets will be part-compiled with a reference to specimen data chunk A. Further, it will be noted that specimen data chunk D already exists in the second chunk section of the chunk store. As noted above, specimen data chunks E and F previously existed in the second chunk section but have since been deleted. Thus, the second chunk section comprises only specimen data chunk D. As a result, and as described above, the second chunk section is therefore physically fragmented. In one embodiment of the present invention, references to such fragmented chunk sections, or the specimen data chunks contained therein, are avoided.

In one embodiment of the present invention, a reference is not made to the specimen data chunk D in the second chunk section but a new specimen data chunk is added, to a third chunk section, corresponding to input data chunk D. It should be appreciated that specimen data chunk D added to the third chunk section may be identical to the specimen data chunk D contained in the second chunk section. In addition, data processing apparatus embodying the present invention may determine that the chunk store does not contain specimen data chunks corresponding to input data chunks G and H. Accordingly, specimen data chunks will be added to the third chunk section (because it has space to add subsequent specimen data chunks). Note that no new specimen data chunks are added to the second chunk section.

It will thus be appreciated that the manifest ADGH references only the first and third chunk sections of the chunk store. There are no references to the second chunk section. An advantage of such an embodiment is that restoring the data set represented by the new manifest ADGH requires read/write operations to be performed only on the first and third chunk sections. There is no need to refer to, or access, the second chunk section.

Without the above-described embodiment of the present invention, then only specimen data chunks G and H may have been added to the third chunk section. The resultant manifest ADGH would then reference the first, second and third chunk sections. This would require an increased number of read/write operations and performance of the restoration of the data sets may be compromised when compared to the above-described embodiments of the present invention.

It will of course be appreciated that the chunk store now contains two instances of specimen data chunk D but it may be that the benefits of the performance of such an arrangement outweigh the potential disadvantages of storing the specimen chunk D twice.

In an embodiment of the present invention, the data processing apparatus is operable to identify a chunk section already containing a specimen data chunk corresponding to at least one input data chunk of an input data set; and store the at least one input data chunk in another chunk section as a specimen data chunk, if the identified chunk section is fragmented to at least a predetermined extent. An advantage of such an arrangement is the avoidance of compiling a manifest representing a new input data set with references to fragmented chunk sections. Since a heavily fragmented chunk section may contain relatively few specimen data chunks, it is unlikely that the identified chunk section will contain specimen data chunks corresponding to other input data chunks of an input data set being processed.

By storing an input data chunk in another chunk section as a specimen data chunk, if the identified chunk section has a predetermined characteristic, a new, un-fragmented, chunk section may be created. Subsequently, when an input data set comprises an input data chunk corresponding to the specimen data chunk, a manifest representing the input set is compiled with a reference to the specimen data chunk in the new chunk section and not the same specimen data chunk in the old, fragmented, chunk section.

In one embodiment when a chunk section already containing a specimen data chunk corresponding to at least one input data chunk has been identified as being fragmented to a predetermined extent—and a specimen data chunk added to another chunk section—all input data sets subsequently processed which comprise an input data chunk corresponding to the same specimen data chunk will only reference the said □another□chunk section, or rather the newly added specimen data chunk therein. However, it is to be noted that any references contained in existing manifests to the specimen data chunk in the, now fragmented, chunk section may be maintained. An advantage of such an arrangement is that references of existing manifests to the specimen data chunk in the fragmented chunk section need not be up-dated to reference the specimen data chunk in the said □another□chunk section.

In another embodiment, however, data processing apparatus may, in time, □up-date□all references to specimen data chunks, so that they all refer to the specimen data chunk in the said □another□chunk section. Such an operation may be performed during □off-peak□periods. By □off-peak□is meant periods where the data processing apparatus is not being used, or not being used to its full capacity. By □another□may be meant a pre-existing chunk section, which has available capacity for specimen data chunks. The □another□chunk section may not be fragmented itself. □Another□chunk section may also mean a newly created or □empty□chunk section.

When restoring manifests representing data sets which comprise references to specimen data chunks in the said □another□chunk sections, it is hoped that the restoration process may be performed more quickly than if the manifests contained a plurality of references to specimen data chunks in fragmented chunk sections.

Non-Contiguity

In another embodiment, data processing apparatus is operable to identify a chunk section already containing a specimen data chunk corresponding to at least one input data chunk of an input data set; and store the at least one input data chunk in another chunk section as a specimen data chunk if a predetermined number or size of specimen data chunks stored in the identified chunk section are non-contiguous with one another. Thus, in this embodiment, the extent of non-contiguity is not of relevance (i.e. the extent of fragmentation) but merely how many of the specimen data chunks stored in the identified chunk section are non-contiguous with one another; in other words, the number of specimen data chunks having spaces between them on disk.

Logical Fragmentation

As each new input data set is processed by data processing apparatus, at least one of the input data chunks in the input data set may not already exist as a specimen data chunk in the chunk store. Thus, a specimen data chunk corresponding to that input data chunk may be added to the chunk store. Other input data sets may, however, comprise input data chunks which correspond to specimen data chunks already stored in the chunk store. Those pre-existing specimen data chunks in the chunk store may have been added at various different times. When processing previous input data sets, it may be the case that a number of new specimen data chunks are added to the chunk store when each new input data set is processed. Part of or a number of chunk sections may comprise all the newly added specimen data chunks for an input data chunk.

In one embodiment, a manifest compiled for an input data set may comprise references to specimen data chunks in a plurality of different chunk sections as a result of the input data set comprising input data chunks corresponding to specimen data chunks that were first added to the chunk store during processing of a number of different and unconnected input data sets. Where a given manifest comprises references to specimen data chunks in a plurality of chunk sections; or rather a plurality of references to the chunk sections themselves, it may be said that the data referenced by the manifest is □logically fragmented□. Whenever the data set represented by the newly compiled manifest needs to be restored, a plurality of read/write operations will need to be performed in order to retrieve the specimen data chunks corresponding to each of the data chunks of the input data set. As a result, processing times and the efficiency of restoring the input data sets may be compromised beyond an acceptable level.

Accordingly, in one embodiment of the present invention, the data processing apparatus is operable to identify a chunk section already containing a specimen data chunk corresponding to at least one input data chunk of an input data set; and store the at least one input data chunk in another chunk section as a specimen data chunk, if the specimen data chunks corresponding to other input data chunks of the input data set being processed are stored in more than a predetermined number of chunk sections.

As an example, suppose that the specimen data chunks corresponding to input data chunks of an input data set are stored in, say, eight different chunk sections. Thus, to represent all of the input data chunks of an input data set the manifest will contain references to eight different chunk sections. If the data set represented by the manifest ever needs to be restored, then read/write operations will need to be carried out on each of the eight chunk sections. In one embodiment of the present invention, it may be determined that such an arrangement is too logically fragmented and processing times and efficiency will be less than the desired level.

In one embodiment, as the data processing apparatus is processing an input data set, and identifying chunk sections containing specimen data chunks corresponding to input data chunks, there may reach a point where the number of chunk sections identified □ and referenced by a manifest being compiled for the input data sets □ reaches a predetermined number or limit. Thereafter, even if specimen data chunks corresponding to other input data chunks of the input data sets are identified in other chunk sections of the chunk store, no reference will be made to those chunk sections in the manifest. This is because references to those chunk sections would mean that more than the predetermined number of chunk sections are referenced by the manifest being compiled for the input data set.

Accordingly, each of the input data chunks yet to be processed in the input data set which correspond to specimen data chunks not in the predetermined number of chunk sections will be added to a new chunk section. As a result, when the manifest is completed for the input data set being processed, the total number of chunk sections referenced by the manifest will be equal to the predetermined number plus one □ the □one□extra chunk section being that where the new specimen data chunks have been stored. Thus, the logical fragmentation of the manifest is capped at a predetermined level.

It should be appreciated that should any input data chunks be found to correspond to specimen data chunks, already stored in one of the chunk sections referenced by the part-compiled manifest (i.e. one of the predetermined number□of chunk sections), the manifest will be compiled with a reference to the relevant chunk section (or the specimen data chunk).

In another embodiment, an input data set may first be analysed in its entirety to see how many specimen data chunks are present in the chunk store which correspond to input data chunks of the input data set. Further, the number of chunk sections containing those specimen data chunks is also analysed. The predetermined number of chunk sections may be selected from the identified chunk sections according to predetermined criteria. The identified chunk sections may be prioritised according to, for example, their physical fragmentation. Only a predetermined number of chunk sections being least fragmented will be the chunk sections referred to by the manifest being compiled for the input data set.

Age of Reference

In another embodiment, the data processing apparatus is operable to identify a chunk section already containing a specimen data chunk corresponding to at least one input data chunk of an input data set; and store the at least one input data chunk in another chunk section as a specimen data chunk if the specimen data chunks in the identified chunk section have been referenced by fewer than a predetermined number of the most recent M manifests to be compiled.

An advantage of this embodiment is that □old□chunk sections, which have been seldom referenced by manifests, are unlikely to be referenced by any newly compiled manifests. If a reference were to be made to the □old□chunk section, it is likely that the data in the old chunk section is in a different location to the majority of specimen data chunks corresponding to the input data chunks of the input data set being processed.

In this embodiment of the present invention, the specimen data chunk contained in the □old□chunk section may effectively be □refreshed□and stored again in a newer chunk section of the chunk store. In one embodiment, the newly stored specimen data chunk may be stored contiguous with, or in close proximity to, other specimen data chunks corresponding to input data chunks of the input data being processed.

Low Relevance

In one embodiment, the data processing apparatus is operable to identify a chunk section already containing a specimen data chunk corresponding to at least one input data chunk of an input data set; and store the at least one input data chunk in another chunk section as a specimen data chunk if fewer than a predetermined number of specimen data chunks in the identified chunk section correspond to input data chunks of the input data sets being processed.

Accordingly, if a chunk section is identified as containing a specimen data chunk corresponding to an input data chunk of an input data set, but no other specimen data chunks in that identified chunk section correspond to any other input data chunks of the input data set, then referencing that identified chunk section will be avoided. In one embodiment, a new specimen data chunk is added to a new chunk section corresponding to the input data chunk. If there are other chunk sections identified having the above characteristic, then it is likely that other specimen data chunks corresponding to input data chunks of the input data set will be added to the same newly created chunk section. As a consequence, the newly created chunk section will contain more than one specimen data chunk which corresponds to input data chunks of the input data set being processed. The number of read/write operations required to restore the data set may therefore be reduced.

Few References

In another embodiment, the data processing apparatus embodying the present invention is operable to identify a chunk section already containing a specimen data chunk corresponding to at least one input data chunk of an input data set; and store the at least one input data chunk in another chunk section, if fewer than a predetermined number of manifests in the manifest store contain a reference to the said corresponding specimen data chunk in the identified chunk section.

Thus, where a given specimen data chunk is only referenced by a few manifests in the manifest store (i.e. less than a predetermined number of manifests in the manifest store), then in compiling a manifest for the input data set, the specimen data chunk may be stored again in a new chunk section.

In one embodiment of the present invention, if an identified chunk section has a predetermined characteristic, numerous examples of which are described above, and a subsequent input data chunk is found to correspond to the specimen data chunk stored in the □another□chunk section, then the data processor is operable to compile a manifest with a reference to the said specimen data chunk stored in the said □another□chunk section.

Thus, when an input data chunk is stored as a specimen data chunk in □another□chunk section, because the identified chunk section has a predetermined characteristic, then all future references will be made to that specimen data chunk in the said □another□chunk section. No other references will be made to the specimen data chunk in the identified chunk section, It may be considered that the identified chunk section is now □obsolete□.

As described above, in some embodiments of the present invention, a reference in the manifest may not be made to the specimen data chunk directly, but to the chunk section containing that specimen data chunk. There may be maintained a record of the location of specimen data chunks within a particular chunk section. Thus, prior to a chunk section being identified as having the predetermined characteristic, manifests will comprise references to the chunk section. However, when that chunk section has been identified as having a predetermined characteristic, then subsequent references by manifests will be made to the said □another□chunk section.

In some embodiments of the present invention, as more and more manifests are deleted from the manifest store, chunk sections will become more and more fragmented. Eventually, all of the specimen data chunks in a given chunk section will be removed from the chunk store. In one embodiment of the present invention, those □empty□chunk sections may be used for storage of subsequent specimen data chunks to be added to the chunk store. However, on one embodiment, only when a chunk section is completely empty may it be used to store subsequent specimen data chunks.

Further, as described above, after a given chunk section has been identified as having a predetermined characteristic, subsequent references of manifests may be made to the said □another□chunk section. As more input data sets are processed, a higher proportion of the total manifests stored in the manifest store will comprise references to the said □another□chunk section. In time, the number of references to the identified (□obsolete□) chunk section will reduce. There will come a time when all of the manifests containing references to the identified (□obsolete□chunk section will be removed. At that point, the only specimen data chunk corresponding to a given input data chunk will be contained in the said □another□chunk section. There will therefore no longer be any duplication of a specimen data chunk in the identified chunk section and the said □another□chunk section. In one embodiment, the size of the chunk sections is configured such that the eventual emptying (decommissioning) of a chunk section is likely to occur in a predetermined period of time or number of iterations. If a chunk section is too large, it may be unlikely that all of specimen data chunks contained therein will be removed in a period of time.

In some embodiments of the present invention when a chunk section has been identified as having a predetermined characteristic, any further reference to any of the specimen data chunks contained therein may be prevented. In other words, not just to the specimen data chunk in the identified chunk section which caused it to be so □ identified, but any of the specimen data chunks contained in the identified chunk section. This may be advantageous when a chunk section has been identified as being physically fragmented.

In one embodiment of the present invention, there is provided a data processor comprising: a plurality of chunk sections, at least one section storing specimen data chunks, a separate manifest store, containing at least one manifest that represents at least a part of a data set and that comprises at least one reference to at least one specimen data chunk stored in a chunk section, the processing apparatus being operable to: process input data into one or more input data chunks; identify a chunk section already containing a specimen data chunk corresponding to at least one input data chunk; and store the at least one input data chunk in another chunk section as a specimen data chunk if the identified chunk section is fragmented to at least a predetermined extent.

In another embodiment of the present invention, there is provided data processing apparatus comprising: a chunk store partitioned into a plurality of chunk sections, each section configured to store specimen data chunks, a manifest store, containing at least one manifest that represents at least a part of a data set and that comprises at least one reference to at least one specimen data chunk stored in the chunk store, the processing apparatus being operable to: process input data into one or more input data chunks; identify a chunk section already containing a specimen data chunk corresponding to at least one input data chunk and references by at least one manifest in the manifest store; and compile a manifest with a reference to the specimen data chunk of the identified chunk section unless the identified chunk section has a predetermined characteristic.

In one embodiment of the present invention, a method of processing data uses a chunk store partitioned into a plurality of chunk sections, at least one section storing specimen data chunks; a manifest store, containing at least one manifest that represents at least a part of a data set and that comprises at least one reference to at least one specimen data chunk stored in the chunk store. The method comprises: processing (13) input data into one or more input data chunks; identifying (14) a chunk section already containing a specimen data chunk corresponding to at least one input data chunk; and storing (15) the at least one input data chunk in another chunk section as a specimen data chunk if the identified chunk section has a predetermined characteristic.

In one embodiment of the present invention, there may further be provided a chunk index containing information on at least one specimen data chunk stored in the chunk store. In the embodiment, the processing apparatus may be operable to use the chunk index to identify a chunk section already containing a specimen data chunk corresponding to at least one input data chunk.

In another embodiment of the present invention, there is provided a method of processing data using a chunk store partitioned into a plurality of chunk sections storing specimen data chunks, the method comprising: processing input data into input data chunks; identifying a specimen data chunk in a chunk section corresponding to an input data chunk; and compiling a manifest with a reference to the specimen data chunk unless the chunk section containing the identified specimen data chunk has a predetermined characteristic.

In one embodiment of the present invention, the data processing apparatus is operable to process input data into input data segments, each segment comprising one or more input data chunks. In addition, the data processing apparatus comprises a manifest store containing at least one manifest it represents at least a part of a data set and is divided into manifest segments. The data processing apparatus may process one input data segment at a time. Thus, a manifest representing an input data set may also be compiled a manifest segment at a time.

Data processing apparatus embodying the present invention may be used in compacting input data sets 1 for storage, encryption or transmission. For example the input data 1 may represent sets of back-up data from a first data storage medium, for storing on a second data storage medium The data processing apparatus 3 embodying the present invention may form part of a data compaction, or de-duplication, management system. The data processing apparatus 3 may be integrated into a data storage system. A data processing apparatus 3 may be configured to operate □actively□as data is sent to the data storage system for storage. Compaction may be performed in real time. Alternatively, data may be presented to the data processing apparatus 3 embodying the present invention during □off peak□periods. By off peak is meant periods where data may not be being presented to a data storage system for storage, and thus data processing apparatus 3 may process data already stored on the data storage system, to reduce any duplicated data already stored on the data storage system. Data processing apparatus embodying the present invention may form part of a data housekeeping system of a data storage system.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. Data processing apparatus comprising:
a chunk store partitioned into a plurality of chunk sections, at least one of the chunk sections storing specimen data chunks,
a processor to:
process input data into input data chunks;
identify a chunk section already containing a specimen data chunk corresponding to a particular one of the input data chunks; and
store the particular input data chunk in another chunk section as a specimen data chunk if the identified chunk section has a predetermined characteristic, wherein the predetermined characteristic is selected from the group consisting of:
a characteristic that specimen data chunks corresponding to other input data chunks of the input data being processed are stored in more than a predetermined number of chunk sections,
a characteristic that specimen data chunks in the identified chunk section have been referenced by fewer than a predetermined number of the most recent M manifests to be compiled,
a characteristic that fewer than a predetermined number of specimen data chunks in the identified chunk section correspond to input data chunks of the input data being processed, and
a characteristic that fewer than a predetermined number of manifests in a manifest store contain a reference to the said corresponding specimen chunk in the identified chunk section.

2. Data processing apparatus comprising:
a chunk store partitioned into a plurality of chunk sections, at least one of the chunk sections storing specimen data chunks,
a processor to:
process input data into input data chunks;
identify a chunk section already containing a specimen data chunk corresponding to a particular one of the input data chunks; and
store the particular input data chunk in another chunk section as a specimen data chunk if the identified chunk section has a predetermined characteristic; and
if the identified chunk section has said predetermined characteristic, and a subsequent input data chunk is found to correspond to said specimen data chunk in said another chunk section, compile a manifest with a reference to said specimen data chunk stored in said another chunk section.

3. Data processing apparatus comprising:
a chunk store partitioned into a plurality of chunk sections, at least one of the chunk sections storing specimen data chunks,
a processor to:
process input data into input data chunks;
identify a chunk section already containing a specimen data chunk corresponding to a particular one of the input data chunks; and
store the particular input data chunk in another chunk section as a specimen data chunk if the identified chunk section has a predetermined characteristic,
if the identified chunk section has said predetermined characteristic, decide not to compile subsequent manifests with references to the said identified chunk section.

4. Data processing apparatus comprising:
a chunk store partitioned into a plurality of chunk sections, at least one of the chunk sections storing specimen data chunks,
a processor to:
process input data into input data chunks;
identify a chunk section already containing a specimen data chunk corresponding to a particular one of the input data chunks; and
store the particular input data chunk in another chunk section as a specimen data chunk if the identified chunk section has a predetermined characteristic,
if the identified chunk section has said predetermined characteristic, store at least one further specimen data chunk of the identified chunk section in said another chunk section.

5. Data processing apparatus comprising:
a chunk store partitioned into a plurality of chunk sections, at least one of the chunk sections storing specimen data chunks,
a processor to:
process input data into input data chunks;
identify a chunk section already containing a specimen data chunk corresponding to a particular one of the input data chunks;
store the particular input data chunk in another chunk section as a specimen data chunk if the identified chunk section has a predetermined characteristic; and
if the identified chunk section does not have the predetermined characteristic, compile a manifest with a reference to the specimen data chunk in the identified chunk section.

6. Data processing apparatus according to claim 5, further comprising a manifest store, containing the manifest that represents at least a part of a data set.

7. Data processing apparatus according to claim 5, further comprising a chunk index containing information on at least one specimen data chunk, the processor to use the chunk index to identify said chunk section already containing a specimen data chunk corresponding to the particular input data chunk.

8. Data processing apparatus according to claim 5, wherein the predetermined characteristic is that the identified chunk section is fragmented to at least a predetermined extent.

9. Data processing apparatus comprising:
a chunk store partitioned into a plurality of chunk sections, at least one of the chunk sections storing specimen data chunks, a processor to:
  process input data into input data chunks;
  identify a chunk section already containing a specimen data chunk corresponding to a particular one of the input data chunks; and
  store the particular input data chunk in another chunk section as a specimen data chunk if the identified chunk section has a predetermined characteristic, wherein the predetermined characteristic is that a predetermined number of specimen data chunks stored in the identified chunk section are non-contiguous with one another.

10. A computer-implemented method of processing data, using:
  a chunk store partitioned into a plurality of chunk sections, at least one of the chunk sections storing specimen data chunks,
  a manifest store, containing at least one manifest that represents at least a part of a data set and that comprises at least one reference to at least one specimen data chunk stored in the chunk store,
  the method comprising: processing input data into one or more input data chunks;
  identifying a chunk section already containing a specimen data chunk corresponding to at least one input data chunk;
  storing the at least one input data chunk in another chunk section as a specimen data chunk if the identified chunk section has a predetermined characteristic; and
  compiling a manifest with a reference to said another chunk section if the identified chunk section has the predetermined characteristic.

11. A method of processing data according to claim 10, further using a chunk index containing information on at least one specimen data chunk, the method further comprising using the chunk index to identify said chunk section already containing a specimen data chunk corresponding to at least one input data chunk.

12. A method of processing data according to claim 10, wherein subsequent manifests are not compiled with references to the identified chunk section if the identified chunk section has the predetermined characteristic.

* * * * *